United States Patent [19]
Brzozowski et al.

[11] Patent Number: 5,969,013
[45] Date of Patent: Oct. 19, 1999

[54] COAL TAR COMPOSITIONS

[75] Inventors: Kenneth J. Brzozowski, Solon; Ken Chernotowich, Twinsburg, both of Ohio

[73] Assignee: W.P. Hickman Systems Inc., Solon, Ohio

[21] Appl. No.: 09/126,144

[22] Filed: Jul. 30, 1998

[51] Int. Cl.⁶ .................................................. C08L 95/00
[52] U.S. Cl. ........................................................ 524/66
[58] Field of Search ................................................. 524/66

[56]       References Cited

U.S. PATENT DOCUMENTS

| | | | |
|---|---|---|---|
| 3,027,342 | 3/1962 | Kemp et al. | 524/60 |
| 3,296,165 | 1/1967 | Kemp | 524/61 |
| 3,497,371 | 2/1970 | Chang | 106/277 |
| 3,835,117 | 9/1974 | Walaschek | 524/60 |
| 3,897,380 | 7/1975 | Walaschek | 524/60 |
| 4,458,043 | 7/1984 | Evans et al. | 524/66 |
| 4,544,690 | 10/1985 | Ladish | 524/60 |
| 4,824,880 | 4/1989 | Algrim et al. | 524/62 |
| 4,835,199 | 5/1989 | Futamura et al. | 524/66 |
| 4,866,116 | 9/1989 | Ek et al. | 524/430 |
| 4,868,233 | 9/1989 | Moran | 524/71 |
| 4,871,792 | 10/1989 | Lucke | 524/59 |
| 4,973,615 | 11/1990 | Futamura et al. | 524/66 |
| 5,004,772 | 4/1991 | Grzybowski et al. | 524/62 |
| 5,047,457 | 9/1991 | Higgins | 524/60 |
| 5,051,477 | 9/1991 | Yu et al. | 525/194 |
| 5,360,848 | 11/1994 | Kuechler et al. | 524/59 |
| 5,854,322 | 12/1998 | Mellott | 524/66 |

OTHER PUBLICATIONS

Kenneth Brzozowski; Asphalt vs. Coal Tar; Contractors Guide, Jul. 1990, pp. 26–28, 30, 34, 36, 37.

*Primary Examiner*—Peter A. Szekely
*Attorney, Agent, or Firm*—Renner, Otto, Boisselle & Sklar

[57]       ABSTRACT

Improved coal tar compositions are described which are prepared from a blend comprising:

(A) based on the combined weight of coal tar and coal tar pitch, from about 80 parts to about 98 parts by weight of coal tar having an overall float test of from about 50 seconds to about 220 seconds, (B) based on the combined weight of coal tar and coal tar pitch, from about 2 parts to about 20 parts by weight of coal tar pitch having a softening point of from about 140° C. to about 160° C., and (C) from about 1% to about 20% by weight, based on the total weight of the composition, of an acrylonitrile-butadiene copolymer. In one embodiment up to 35 parts by weight of the coal tar (A) is replaced with a coal tar selected from coal tars having softening points of from about 52° C.–60° C., and from about 56° C.–64° C. The coal tar compositions are not emulsions, and generally will not contain any significant amount of water (e.g., less than 0.5% by weight). The invention also relates to a process for preparing the coal tar compositions which comprises the steps of:

(A) preparing at an elevated temperature, a first mixture comprising
 (A-1) from about 80 parts to about 98 parts by weight of coal tar having an overall float test of from about 50 seconds to about 220 seconds, and
 (A-2) from about 2 parts to about 20 parts by weight of coal tar pitch having a softening point of from about 140° C. to about 160° C., (B) maintaining the first mixture at a temperature of at least about 170° C., (C) adding to the first mixture, from about 1% to about 20% by weight, based on the total weight of the composition, of an acrylonitrile-butadiene copolymer to form a second mixture and (D) mixing the copolymer into the second mixture.

The coal tar compositions of the present invention are useful particularly as roofing, waterproofing and maintenance materials. More particularly, the coal tar compositions are useful in built-up roofing (BUR) applications. The coatings formed from the coal tar compositions of the invention exhibit improved tensile, elongation and recovery characteristics, improved fatigue resistance, improved adhesive qualities, and improved cold temperature performance.

26 Claims, No Drawings

COAL TAR COMPOSITIONS

FIELD OF THE INVENTION

The present invention relates to coal tar compositions useful in hot built-up roofing applications. More particularly, the present invention relates to coal tar compositions having improved properties such as tensile and elongation, adhesion, low temperature performance, and cold flow properties.

BACKGROUND OF THE INVENTION

Bituminous materials, especially asphalt and coal tars, have been utilized as roofing materials particularly in built-up roofing (i.e., BUR) applications, as road paving materials, and as adhesive materials. However, such materials tend to deteriorate under conditions of extreme temperature variations, constant exposure to physical stress, and environmental weathering. Various proposals have been made in the art to modify the bituminous materials to overcome these deficiencies.

Although asphalt and coal tar have a similar appearance when in a package or in a finished roof, they are derived from different raw materials, and they are also different in their chemistry. Coal tar is obtained by heating bituminous coal tar to very high temperatures and collecting the volatile materials that are produced. These volatiles are referred to as crude coke oven tar, and the solid residue left behind is called coke. The crude coke oven tar is processed to recover a variety of materials including creosote and precursors for a large number of other important chemicals. The residue left after this processing step is called coal tar pitch which comprises primarily aromatic hydrocarbons. The coal tar pitch is the material used in the more familiar applications of roofing and asphalt concrete surfacing.

Asphalt, on the other hand, is derived from petroleum or crude oil and comprises primarily aliphatic hydrocarbons. Crude oil is processed at a refinery by distilling off the "light ends" to produce materials such as propane, gasoline, fuel oils, and chemical intermediates. The residue that remains from the distillation is referred to as straight-run asphalt. Straight run asphalt is processed primarily for road paving applications, and after further processing (e.g., oxidation or blowing), it is converted to roofing asphalts designated as D312 Types I through IV, by the American Society for Testing and Materials (ASTM).

The present invention relates to compositions which are prepared from coal tar as opposed to compositions which are prepared from asphalt. Aqueous coal tar emulsions have been described in the prior art as useful in preparing protective coatings. In its most common form, an aqueous coal tar emulsion comprises an emulsion of a coal tar in an aqueous medium with an emulsifying or dispersing agent such as an organic soap or detergent and/or an inorganic colloid such as a particulate clay. A conventional practice in the protective coating art is to brush, spray or paint the articles with an aqueous emulsion of coal tar. When the coating of coal tar dries on the article, it provides a protective film. Such films, however, have certain disadvantages such as being attacked by various solvents, being soft, and having inadequate ductility or tensile strength. It has been proposed to improve these properties by including various additives into the emulsions. Thermoplastic rubbers, for example, have been suggested as useful additives for coal tar emulsions to improve solvent resistance and elasticity of the film. In particular, a synthetic acrylonitrile-butadiene latex has been suggested as being useful for adding to coal tar emulsions. U.S. Pat. No. 3,027,342 describes a rubberized coal tar emulsion by dissolving a copolymer of acrylonitrile and butadiene and coal tar to form a solution which can be successfully emulsified in an aqueous medium without the addition of an emulsifying agent. U.S. Pat. No. 3,296,165 describes a coal tar emulsion composition comprising an emulsion coating including an emulsified coal tar/clay mixture and a butyl rubber latex. The compositions described in the '165 patent also include an aluminum powder additive.

U.S. Pat. No. 3,497,371 describes coal tar emulsions containing certain filler materials, a synthetic rubber latex, and certain water-soluble organic amines.

U.S. Pat. Nos. 3,835,117 and 3,897,380 describe rubberized coal tar emulsion compositions especially suitable for sealing bituminous pavement compositions such as asphalt pavement compositions. The rubberized coal tar emulsions described in these two patents comprises a major portion of a prepared coal tar pitch emulsion and water and a minor portion of an acrylonitrile-butadiene copolymer latex having an average particle size between 400 and 1000 angstroms, and, optionally, a silicone resin.

U.S. Pat. No. 4,544,690 also describes aqueous rubberized coal tar emulsions. The coal tar emulsions described in this patent comprise a major portion of a commercial coal tar emulsion and water admixed with a small amount of a carboxylated butadiene-styrene-acid copolymer latex having a particular size. The emulsions also may contain a fine aggregate filler material such as sand. Such emulsions are reported to exhibit a high degree of spreadability, and to provide a sealing coating that has a long life.

U.S. Pat. Nos. 4,835,199 and 4,973,615 describe bituminous compositions comprising a blend of bitumen (including asphalts and tars) and a thermoplastic elastomer containing at least two polymer blocks wherein one of said polymer blocks is a crystalline polymer block and one of said polymer blocks is an amorphous polymer block. Examples of such thermoplastic elastomers include styrene-butadiene block copolymers. The compositions described in the '615 patent also include a polyolefin.

SUMMARY OF THE INVENTION

Improved coal tar compositions are described which are prepared from a blend comprising:

(A) based on the combined weight of coal tar and coal tar pitch, from about 80 to about 98 parts by weight of coal tar having an overall float test of from about 50 seconds to about 220 seconds, (B) based on the combined weight of coal tar and coal tar pitch, from about 2 to about 20 parts by weight of coal tar pitch having a softening point of from about 140° C. to about 160° C., and (C) from about 1 to about 20% by weight, based on the total weight of the composition, of an acrylonitrile-butadiene copolymer. In one embodiment, up to about 35% by weight of the coal tar (A) is replaced with a coal tar pitch having a softening point of from about 52–60° C. The coal tar compositions are not emulsions, and generally will not contain any significant amount of water (e.g., less than 0.5% by weight). The invention also relates to a process for preparing the coal tar compositions which comprises the steps of:

(A) preparing at an elevated temperature, a first mixture comprising (A-1) from about 80 parts to about 98 parts by weight, or from about 90 parts to about 98 parts by weight, of coal tar having an overall float test of from about 50 seconds to about 220 seconds, and (A-2) from about 2 parts to about 20 parts by weight of coal tar pitch having a softening point of from about 140° C. to about 160° C., (B) maintaining the first mixture at a temperature of at least about 170° C., (C) adding to the first mixture, from about 1 to about 20% by weight, based on the total weight of the composition, of an acrylonitrile-butadiene copolymer to form a second mixture and (D) mixing the copolymer into the second mixture.

The coal tar compositions of the present invention are useful particularly as roofing, waterproofing and maintenance materials. More particularly, the coal tar compositions are useful in built-up roofing (BUR) applications. The coatings formed from the coal tar compositions of the invention exhibit improved elongation and recovery characteristics, improved fatigue resistance, improved cold temperature performance, and improved adhesive qualities.

DESCRIPTION OF THE PREFERRED EMBODIMENT

The present invention is directed to coal tar compositions prepared from a blend of materials comprising coal tar, coal tar pitch having certain characteristics, and an acrylonitrile-butadiene copolymer. The coal tar compositions of the invention are substantially free of water, i.e., they contain less than 0.5% of water. The coal tar compositions, in one embodiment, also are substantially free (i.e., <1% w) of sand or other particulate fillers.

The first essential ingredient of the coal tar compositions of the present invention is coal tar. The coal tar which is utilized in the coal tar compositions of the present invention is a coal tar having a float test of from about 50 seconds to about 220 seconds as determined by ASTM Test D139 entitled Test Method for Float Test for Bituminous Materials which is commonly used for testing the viscosity of semi-solid bituminous material. Such coal tars are of the types conventionally designated as RT-7 to RT-12 coal tars. The coal tars with the higher viscosity ranges such as RT-11 and RT-12 coal tars are preferred, and the most preferred coal tar at the present time is the RT-12 coal tar. RT11 has a float test of 100 to 150 seconds at 50° C. and RT12 has a float test of 150–220 seconds at 50° C. The standard specification for these and other road tars (RT) is found in ASTM D490-92. The RT-11 and RT-12 coal tars contain no water and have a minimum specific gravity at 25/25° C. of 1.16.

In one embodiment of the invention, up to about 35 parts by weight of the coal tar normally present in the blend can be replaced by coal tars designated by ASTM D450, Types I and III. These have respective softening points (ASTM D36) of 52° C. to 60° C. and 56° C. to 64° C.

A second essential ingredient of the present invention is a coal tar pitch having a softening point of from about 140° C. to about 160° C. More often, the coal tar pitch used in the present invention will have a softening point of from about 145° C. to 155° C. and most often in the range of from about 148° C. to about 152° C. The softening point of the coal tar pitch can be determined by ASTM Test designations D-36, D3104 or D3461. Such coal tar pitches are available commercially, and one source is the Smith Facing & Supply Company, Cleveland, Ohio as flaked coal tar pitch.

A third essential ingredient of the blend used to prepare the coal tar compositions of the present invention is a copolymer of acrylonitrile and 1,3-butadiene. Generally, the copolymers will comprise a major amount of butadiene and a minor amount of the acrylonitrile. Minor amounts of other monomers may also be present, but the copolymers are preferred. In another preferred embodiment, the copolymers are not cross-linked. The acrylonitrile content of the copolymer may range from about 20% to about 40 or 45% by weight, although it is preferred that the acrylonitrile content of the copolymer is between about 25% to about 35% by weight. As the acrylonitrile content increases, it becomes increasingly more difficult to dissolve the copolymer in the tar. The acrylonitrile-butadiene copolymers also may be characterized as having a Mooney viscosity (ML-4 at 100° C.) in the range of from about 25 to about 100 as determined by ASTM D1646. More often, the Mooney viscosity will be in the range of from about 25 to about 85. Blends of two or more acrylonitrile copolymers also can be utilized to provide coal tar compositions having the desired properties. Useful acrylonitrile-butadiene copolymers are available commercially from, for example, the Chemical Division of Goodyear Tire and Rubber Company, Akron, Ohio under the general trade designation Chemigum, and Zeon Chemicals Inc., Louisville, Ky. under the general trade designation Nipol. Examples of acrylonitrile-butadiene copolymers which are commercially available from Goodyear in bale form include those Chemigum products identified in the following table.

TABLE I

| Chemigum Designation | Bound Acrylonitrile (%) | Mooney Viscosity ML-4 @ 100° C. |
| --- | --- | --- |
| N386B | 40.5 | 55–65 |
| N683B | 33.4 | 25–35 |
| N685B | 33.4 | 45–55 |
| N687B | 33.4 | 65–75 |
| N689B | 33.4 | 79–91 |
| N785B | 27.7 | 45–55 |
| N984B | 20.0 | 35–45 |
| N300 | 40.0 | 50–63 |
| N608 | 33.4 | 63–75 |
| N612B | 33.4 | 20–30 |
| N615B | 33.4 | 47–60 |
| N628B | 33.4 | 68–85 |

Some of the copolymers listed in Table I also are available from Goodyear in powder form and these are identified with a P in place of the N.

The acrylonitrile-butadiene copolymers may contain other materials such as partitioning agents. Examples of useful partitioning agents include polyvinyl chloride and inorganic materials such as powdered calcium carbonate. The amount of partitioning agent present in the acrylonitrile-butadiene copolymers may vary over a wide range although it is generally preferred that the amount of partitioning agent be within the range of from about 5 to about 15% by weight.

As mentioned above, the coal tar compositions of the present invention are prepared from a blend comprising the three essential ingredients and the optional coal tar pitch having a softening point in the range of 52–60° C., described above. Generally, the coal tar compositions are prepared from a blend comprising (A) from about 80 to about 98 parts by weight of the coal tar having an overall float test of from about 50 seconds to about 220 seconds, (B) from about 2 to about 20 parts by weight of coal tar pitch having a softening point of from about 140° C. to about 160° C., and (C) from about 1 to about 20% by weight, based on the total weight of the composition, of an acrylonitrile-butadiene copolymer. In one preferred embodiment, the blend comprises a mixture of from about 86 to about 98 parts by weight, or from about 90 parts to about 98 parts by weight, of the coal tar. In another embodiment, the blend comprises from about 5 to about 18 parts by weight more often from about 7 to about 13 parts by weight of the coal tar pitch, and in a further embodiment, the blend comprises from about 5 to about 15% by weight, based on the total weight of the composition, of the acrylonitrile-butadiene copolymer.

As discussed above, up to about 35 parts by weight of the coal tar (A) can be replaced by a coal tar having a softening point in the range of 52°–60° C. or 56° C. to 64° C. In this embodiment, the coal tar compositions may comprise (A) from about 50 to about 98 parts by weight of coal tar having an overall float test of from about 50 seconds to about 220 seconds, (B) from about 0 to about 35 parts by weight of coal tar selected from coal tars having softening points of about 52° C. to 60° C. and 56° C. to 64° C., (C) from about 2 to about 20 parts by weight of coal tar pitch having a softening point of from about 140° C. to about 160° C., and (D) from about 1 to about 20% by weight of an acrylonitrile-butadiene copolymer.

The coal tar, coal tar pitch and acrylonitrile-butadiene copolymer can be blended by any of the known methods used for blending asphalt materials. The order of blending is not critical, although it is preferred first to add the coal tar pitch to the coal tar in a high shear mixing apparatus, and after this mixture is blended and the coal tar pitch is dissolved in the coal tar, the acrylonitrile-butadiene copolymer is added to the hot blended mixture of the coal tar and coal tar pitch in the high shear mixing apparatus which will reduce the copolymer into smaller particles as they are being dispersed into the hot coal tar/pitch mixture. Alternatively, the coal tar and acrylonitrile-butadiene copolymer can be blended followed by the coal tar pitch. It is important that the mixing apparatus should be of the type, which is capable of drawing the lighter weight materials (e.g., the coal tar pitch and the acrylonitrile-butadiene copolymer) into the liquid coal tar. For example, a variety of known stator-rotor and disperser blade units can be used successfully to achieve this result. If this result is not achieved, the light weight materials will float on top and will not be incorporated into the product.

Thus in a preferred embodiment the coal tar compositions of the present invention may be prepared by the process which comprises the steps of (A) preparing at an elevated temperature, a first mixture comprising
(A-1) from about 80 parts to about 98 parts by weight of coal tar having an overall float test of from about 50 seconds to about 220 seconds, and
(A-2) from about 2 parts to about 20 parts by weight of coal tar pitch having a softening point of from about 140° C. to about 160° C., (B) maintaining the first mixture at a temperature of at least about 170° C., (C) adding to the first mixture, from about 1 to about 20% by weight, based on the total weight of the composition, of an acrylonitrile-butadiene copolymer and (D) mixing the copolymer into the second mixture.

The coal tar (A-1) and the coal tar pitch (A-2) generally are heated to a temperature of at least about 170° C., preferably from about 180° C. to about 200° C. prior to mixing in step (A). After all of the coal tar pitch (A-2) is added to the coal tar (A-1) in step A, the mixture is, subjected to high shear mixing at elevated temperature to ensure that the pitch is thoroughly blended and dissolved in the coal tar. Thus, mixing is continued in step (B) for a period of from about 3 to about 10 minutes or more. The mixture in step (B) preferably is maintained at a temperature in the range of from about 160° C. to about 200° C., and more often, in the range of from about 165° C. to about 185° C.

The acrylonitrile-butadiene copolymer is added to the first mixture with high shear mixing to form a second mixture while maintaining the second mixture at a temperature of at least about 160° C. and preferably at a temperature of from about 170° C. to about 185° C. After all of the copolymer is added, the second mixture is maintained at the above indicated temperatures for about 30 minutes to 1.5 hours. Successful completion of the mixing process is determined in one embodiment by determining that the softening point of a sample of the blended product is in the desired range of about 55° C. to about 70° C., and more often in the range of about 57–64° C. If the softening point is lower than desired, the softening point can be raised by adding a small amount (e.g., 2.5% w) of the coal tar pitch or of the acrylonitrile-butadiene copolymer (e.g., 1% w) and mixing for an additional 10 to 20 minutes.

The coal tar compositions of the present invention generally are characterized as having a Ring and Ball softening point (ASTM D36) of between about 55° C. and 70° C., a penetration range at 25° C. (ASTM D5) of from about 30 to about 90 units, and more often, from about 35 to about 60 units; an elongation (ASTM D412) of at least 800%, preferably from about 800 to about 1500%, and typically at least about 1000%; a tensile strength (ASTM D412) of at least 25 psi, preferably from about 25 to about 100 psi, and typically at about 50 psi; and a cold temperature bend, 1 inch Mandrel (ASTM D3111) of at least about −1° C. (30° F.) more often from about −1° C. to 10° C. (30°–50° F.), and typically, about 2° C. (about 35° F.). In one preferred embodiment, the coal tar compositions of the present invention are characterized as having a softening point in the range of from about 57° C. to about 64° C. (135–148° F.).

The following Table II contains examples illustrating the blends utilized to prepare the coal tar compositions of the present invention, and some of the properties of the coal tar compositions formed from the blends. The Chemigums used in the examples contain about 8 to 10% of powdered calcium carbonate as a partitioning agent. Unless otherwise indicated in the following examples, in the written description and in the appended claims, all parts and percentages are by weight, temperatures are in degrees centigrade, and pressure is at or near atmospheric pressure.

The blends described in the following table are prepared by the following general procedure. The coal tar is preheated to a temperature of at least 170° C., generally at a temperature within the range of from about 180° C. to about 200° C. and added to a high energy mixing vessel. While maintaining the coal tar at this elevated temperature in the mixing vessel, the coal tar pitch is added, and the contents of the mixing vessel are mixed for at least five minutes while heating to maintain the mixture at the above-indicated elevated temperature to ensure that the coal tar pitch has adequate time to thoroughly dissolve in the coal tar. The heating is necessary also to ensure that the mixture is at the desired temperature before the acrylonitrile-butadiene copolymer is added. Stirring within the mixing vessel should be set to develop a good vortex in the batch and to ensure that the light weight powdered pitch will be drawn down into the liquid tar and result in thorough blending of the two coal tar components.

The acrylonitrile-butadiene copolymer is then added to the reaction vessel while stirring is maintained to provide a good vortex in the batch to ensure that the lighter weight copolymer is drawn into the mix to be completely encapsulated with the coal tar. After about 10 minutes of mixing, or when there is a noticeable increased amperage or power draw by the motor, its speed should be reduced to minimize excessive aeration of the product. After all of the copolymer is added to the mixing vessel, the contents of the vessel are mixed for an additional 60 minutes while maintaining the temperature of the mixture at 170° C. or more. The softening point of the finished product is determined per ASTM procedure D36 (modified by using a digital thermometer with metal probe). When the softening point is found to be in the acceptable range, the finished product can be transferred to a holding tank to await proper packaging conditions.

be understood that the invention disclosed herein is intended to cover such modifications as fall within the scope of the appended claims.

We claim:

1. A coal tar composition prepared from a blend comprising:
   (A) based on the combined weight of coal tar and coal tar pitch, from about 80 parts to about 98 parts by weight of coal tar having an overall float test of from about 50 seconds to about 220 seconds,
   (B) based on the combined weight of coal tar and coal tar pitch, from about 2 parts to about 20 parts by weight of coal tar pitch having a softening point of from about 140 to about 1 60° C., and
   (C) from about 1% to about 20% by weight, based on the total weight of the composition, of an acrylonitrile-butadiene copolymer.

2. The composition of claim 1 wherein the coal tar (A) has an overall float test of from about 150 to about 220 seconds.

TABLE II

| | Example | | | | | | | | | | | |
|---|---|---|---|---|---|---|---|---|---|---|---|---|
| Ingredients(PHT)** | 1 | 2 | 3 | 4 | 5$^a$ | 6$^a$ | 7 | 8 | 9$^b$ | 10$^c$ | 11 | 12 |
| RT-12 | 90 | 92.5 | 92.5 | 95 | 95 | 95 | 92.5 | 92.5 | 90 | 90 | 87.5 | 87.5 |
| Coal Tar Pitch* | 10 | 7.5 | 7.5 | 5 | 5 | 5 | 7.5 | 7.5 | 10 | 10 | 12.5 | 12.5 |
| Chemigum N615B | 2 | 2 | 3 | 2 | 8 | 9 | 9 | 10 | 8 | 9 | 8 | 9 |
| Chemigum P609B | 6 | 6 | 7 | 6 | 0 | 0 | 0 | 0 | 0 | 0 | 0 | 0 |
| Properties | | | | | | | | | | | | |
| Softening Point (° F.) | 137 | 133 | 141.5 | 130.5 | 131 | 133.3 | 141 | 141.5 | 136.3 | 140.5 | 144 | 147.5 |
| Penetration (Units) | 74.5 | 73.5 | 85.5 | 85.5 | 66.2 | 86.5 | 65.5 | 85.5 | 58.2 | 44 | 43.5 | 46.5 |
| Elongation (%) | 1580 | 1520 | 1660 | 1630 | 1782 | 1690 | 1488 | 1660 | 1562 | 1250 | 1060 | 910 |

*Coal tar pitch flakes from Smith Facing & Supply - softening point 148–152° C.
(a) Properties are an average of 3 batches
(b) Properties are an average of 5 batches
(c) Properties are an average of 2 batches
**per hundred tart The coal tar compositions of the present invention are useful in built-up roofing, waterproofing and maintenance materials. The compositions retain the advantages of coal tar, such as water and bacteria resistance, but also exhibit the superior properties which result from the modification with the coal tar pitch and the acrylonitrile-butadiene polymer. Some of these property improvements include improved elongation and recovery characteristics, improved fatigue resistance, improved adhesive qualities, etc. The coal tar compositions are useful as an interply adhesive, floodcoat or maintenance treatment with improved resistance to cold cracking typically experienced at lower temperatures with standard coal tar. The coal tar compositions also may be utilized as surface coatings for aged built-up roofs to restore waterproofing characteristics and to add service life to the membranes. More particularly, the coal tar compositions of the present invention are useful as a high performance surfacing bitumen for ASTM D450 Type I or Type III coal tar built-up membranes; as floodcoats for new built-up roof systems constructed with ASTM D312 asphalts, Types I through IV; as maintenance topcoats for coal tar and aged asphalt roofs; and as an interply additive.

While the invention has been explained in relation to its preferred embodiments, it is to be understood that various modifications thereof will become apparent to those skilled in the art upon reading the specification. Therefore, it is to 3. The composition of claim 1 wherein the blend comprises from about 86 parts to about 98 parts by weight of coal tar.

4. The composition of claim 1 wherein the blend comprises from about 5 parts to about 18 parts by weight of the coal tar pitch.

5. The composition of claim 1 wherein the coal tar pitch in the blend has a softening point of from about 145° C. to about 155° C.

6. The composition of claim 1 wherein the coal tar pitch in the blend has a softening point in the range of from about 148° C. to about 152° C.

7. The composition of claim 1 wherein the blend comprises from about 5% to 15% by weight, based on the total weight of the composition, of an acrylonitrile-butadiene copolymer.

8. The composition of claim 1 wherein the acrylonitrile-butadiene copolymer contains from about 20% to about 45% by weight of acrylonitrile.

9. The composition of claim 1 wherein the acrylonitrile-butadiene copolymer contains from about 25% to about 35% by weight of acrylonitrile.

10. The composition of claim 1 wherein the acrylonitrile-butadiene copolymer contains from about 5% to about 15% by weight of at least one partitioning agent.

11. The composition of claim 1 wherein up to about 35 parts of the coal tar (A) is replaced with a coal tar selected from coal tars having softening points of from about 52° C. to about 60° C. and from about 56° C. to about 64° C.

12. The composition of claim 1 wherein the acrylonitrile-butadiene copolymer has a Mooney viscosity (ML-4@100° C.) of from about 25 to about 85.

13. The composition of claim 1 containing less than about 0.5% by weight of water.

14. The composition of claim 1 characterized as having a ring and ball softening point in the range of from about 55° C. to about 70° C.

15. The composition of claim 1 characterized as having an elongation (ASTM D412) of at least about 1000%.

16. A coal tar composition for roofing applications prepared from a blend comprising:
   (A) based on the combined weight of coal tar and coal tar pitch, from about 80 parts to about 98 parts by weight of coal tar having an overall float test of from about 150 to 220 seconds,
   (B) based on the combined weight of coal tar and coal tar pitch, from about 2 parts to about 20 parts by weight of coal tar pitch having a softening point range of from about 145° C. to about 155° C., and
   (C) from about 1% to about 20% by weight, based on the total weight of the composition, of an acrylonitrile-butadiene copolymer containing from about 35 to about 45% by weight of acrylonitrile.

17. The composition of claim 16 wherein the blend comprises from about 86 parts to about 98 parts by weight of the coal tar.

18. The composition of claim 16 wherein the blend comprises from about 5 parts to about 18 parts by weight of the coal tar pitch.

19. The composition of claim 16 wherein the blend comprises from about 5% to about 15% by weight, based on the total weight of the composition, of the acrylonitrile-butadiene copolymer.

20. The composition of claim 16 wherein the acrylonitrile-butadiene copolymer comprises from about 5% to about 15% by weight of calcium carbonate and is characterized as having a Mooney viscosity (ML-4@100° C.) between about 25 to about 85.

21. The composition of claim 16 wherein up to about 35 parts by weight of the coal tar (A) is replaced with a coal tar selected from coal tars having softening points of from about 52° C. to about 60° C. and from about 56° C. to about 64° C.

22. A process for preparing a coal tar composition useful for roofing applications which comprises the steps of:
   (A) preparing at an elevated temperature, a first mixture comprising
      (A-1) based on the combined weight of coal tar and coal tar pitch, from about 80 parts to about 98 parts by weight of coal tar having an overall float test of from about 50 seconds to about 220 seconds, and
      (A-2) based on the combined weight of coal tar and coal tar pitch, from about 2 parts to about 20 parts by weight of coal tar pitch having a softening point of from about 140 to about 160° C.,
   (B) maintaining the first mixture at a temperature of at least about 170° C.,
   (C) adding to the first mixture, from about 1% to about 20% by weight, based on the total weight of the composition, of an acrylonitrile-butadiene copolymer to form a second mixture and
   (D) mixing the copolymer into the second mixture.

23. The process of claim 22 wherein the coal tar (A-1) has an overall float test of from about 150 to about 220 seconds.

24. The process of claim 22 wherein the first mixture comprises from about 90 parts to about 98 parts by weight of coal tar.

25. The process of claim 22 wherein the coal tar pitch (A-2) in the blend has a softening point of from about 145° C. to about 155° C.

26. The process of claim 22 wherein the acrylonitrile-butadiene copolymer added in step (C) contains from about 20% to about 45% by weight of acrylonitrile.

* * * * *